Aug. 11, 1925.

D. S. SEYMOUR

OVERSEAMING MACHINE

Filed Feb. 27, 1919

Inventor

Dudley S. Seymour

Witness

Lloyd R. Cornwall

By Sturtevant Mason

Attorneys

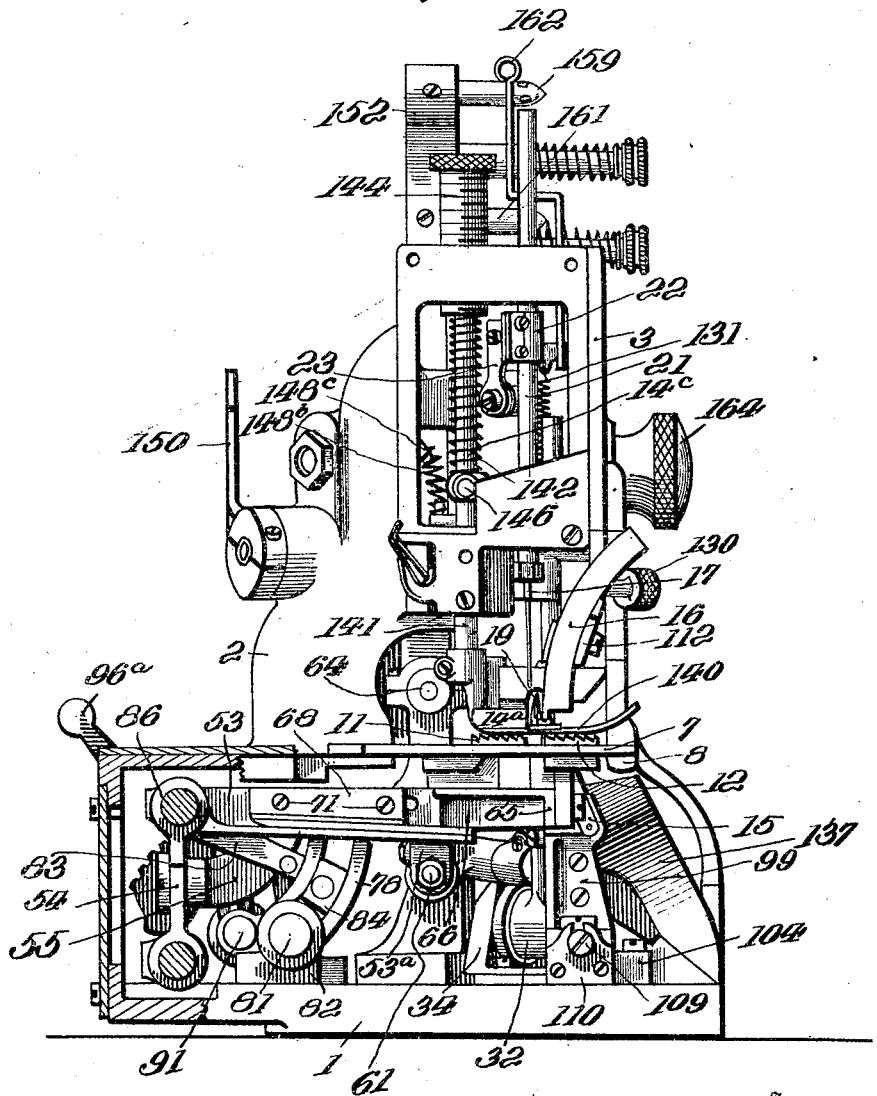

Aug. 11, 1925.
D. S. SEYMOUR
1,548,909
OVERSEAMING MACHINE
Filed Feb. 27, 1919      14 Sheets-Sheet 4
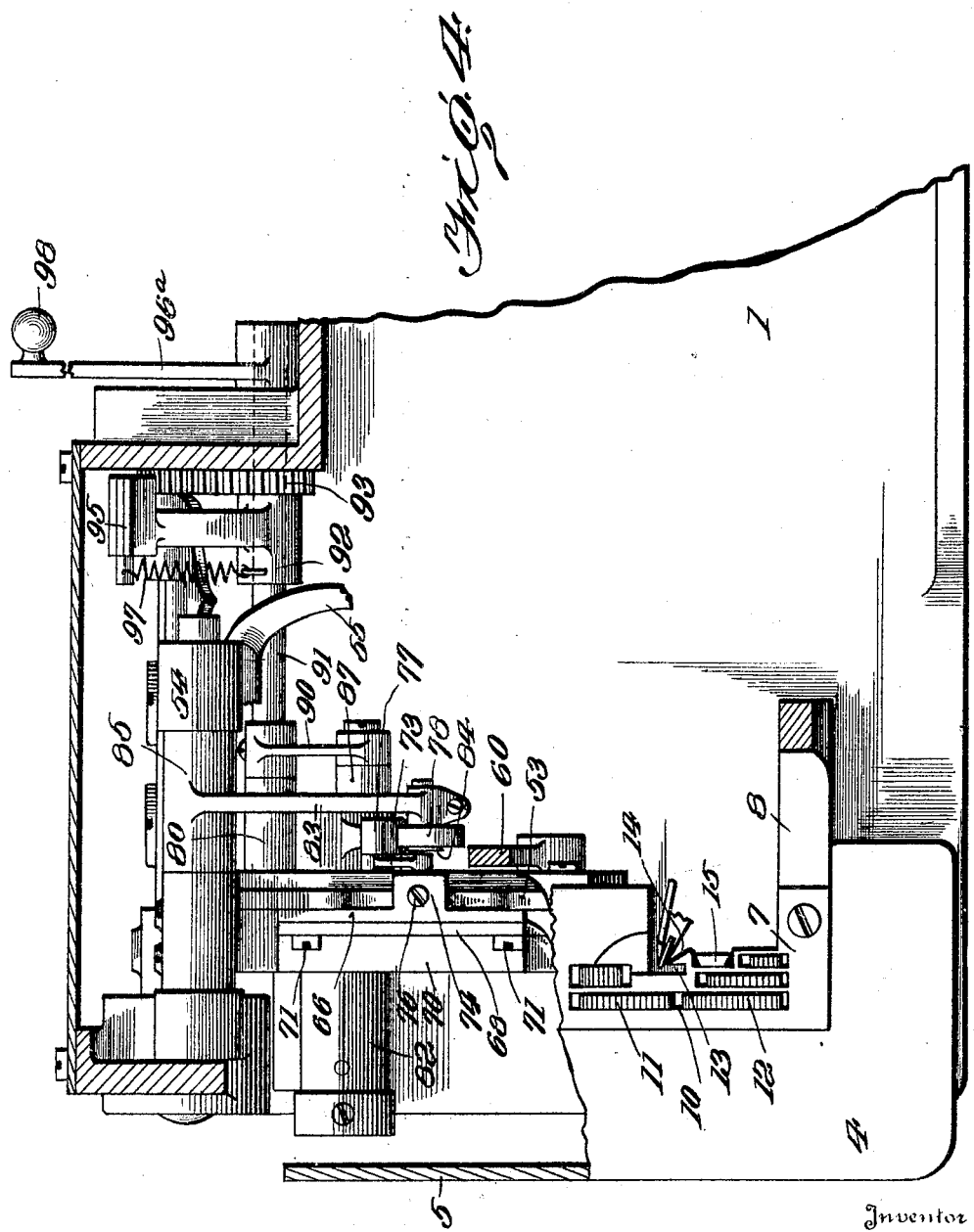
Witness
Floyd R. Cornwall.
Inventor
Dudley S. Seymour
By Sturtevant & Mason
Attorneys

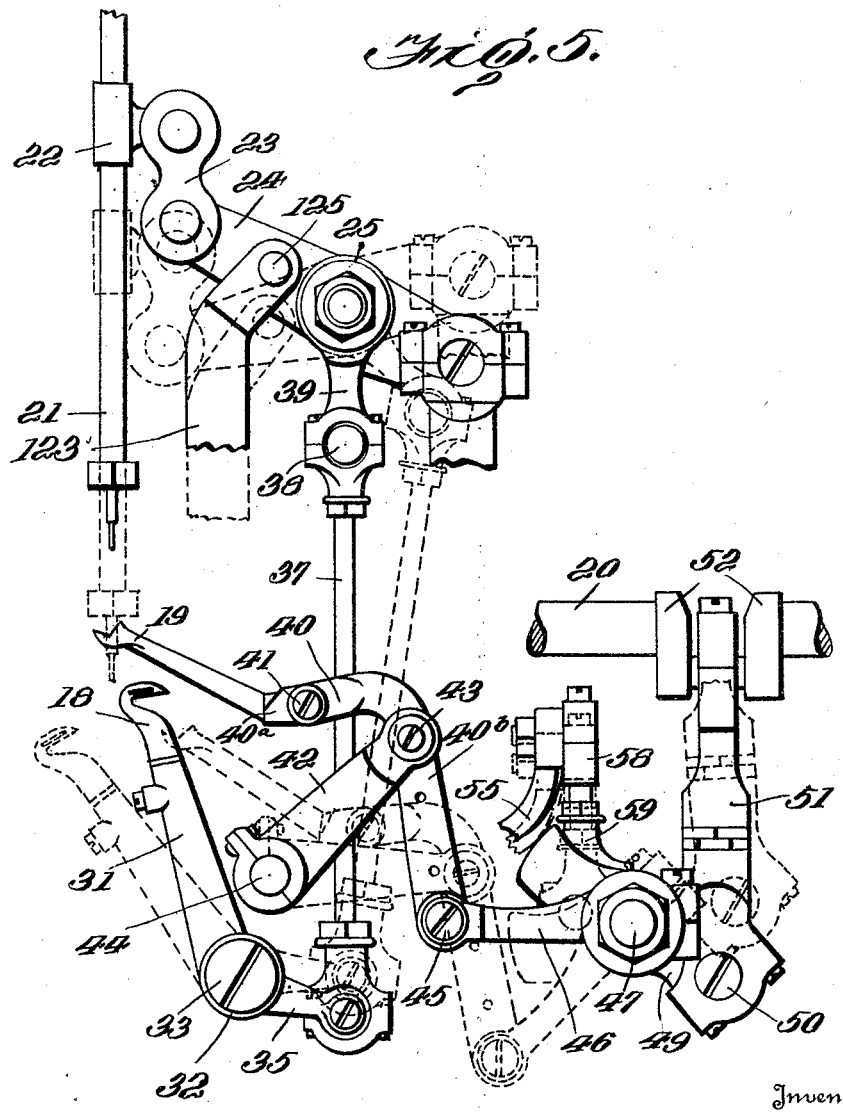

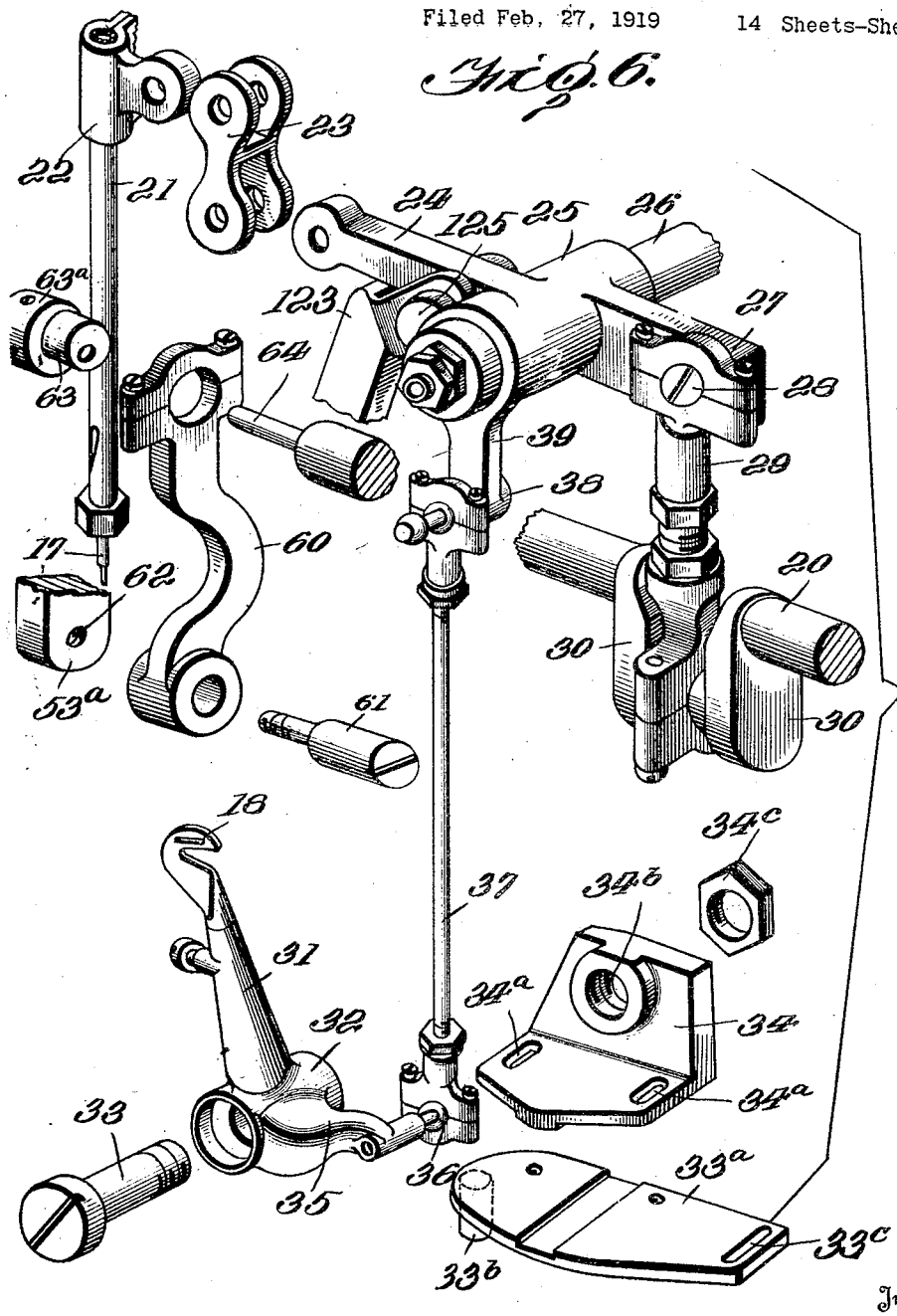

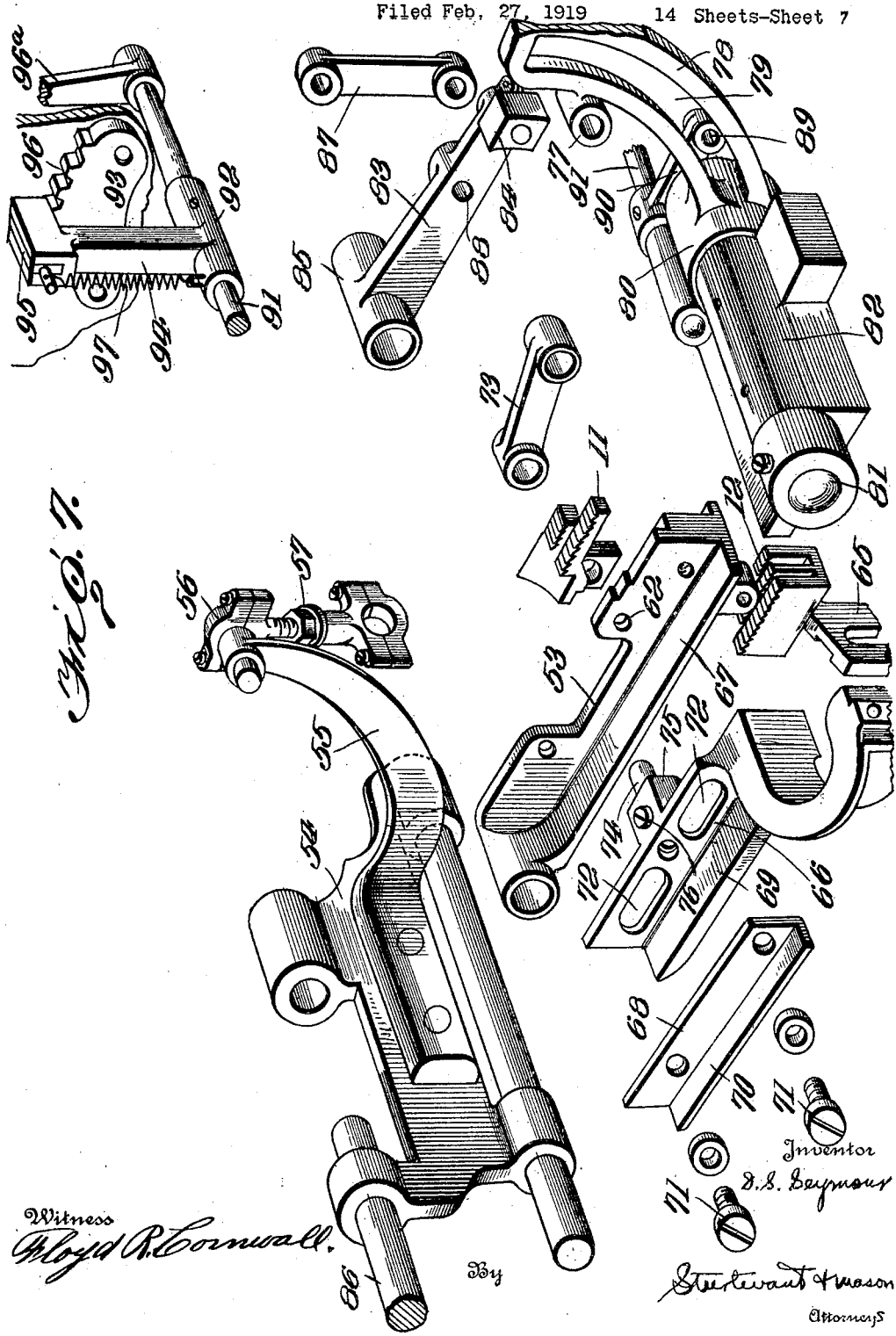

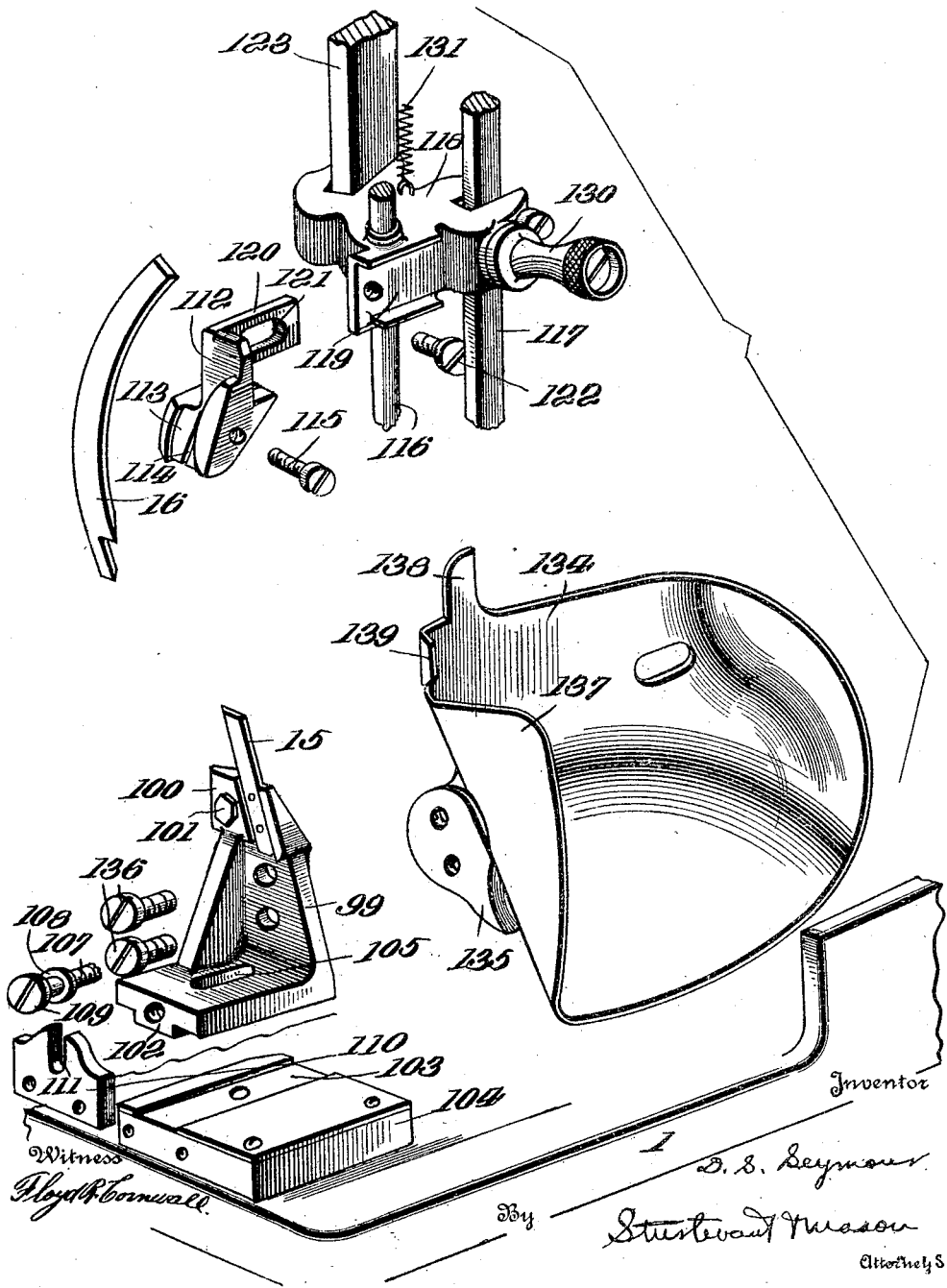

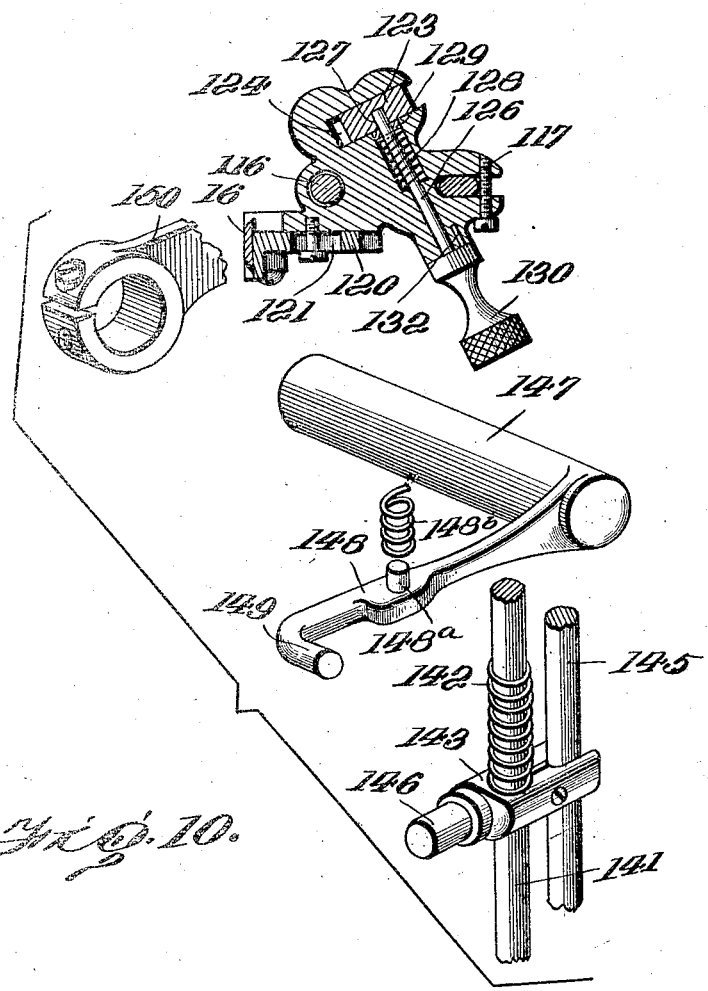

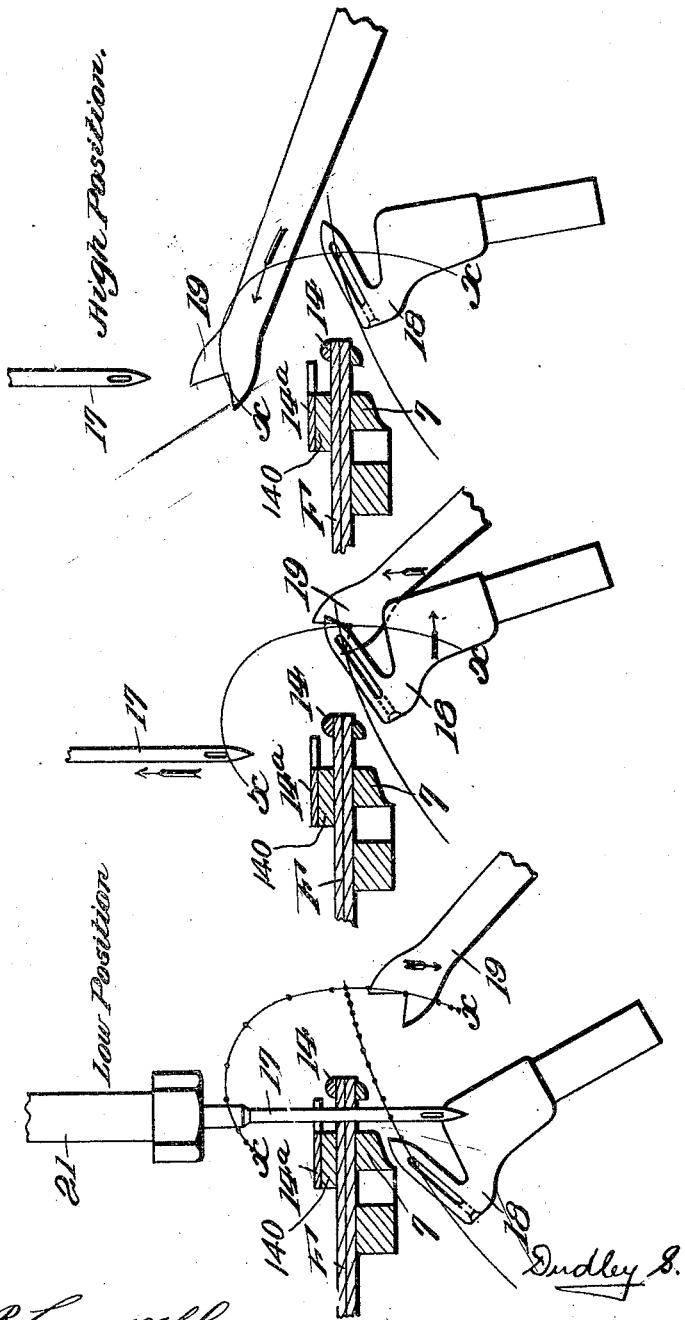

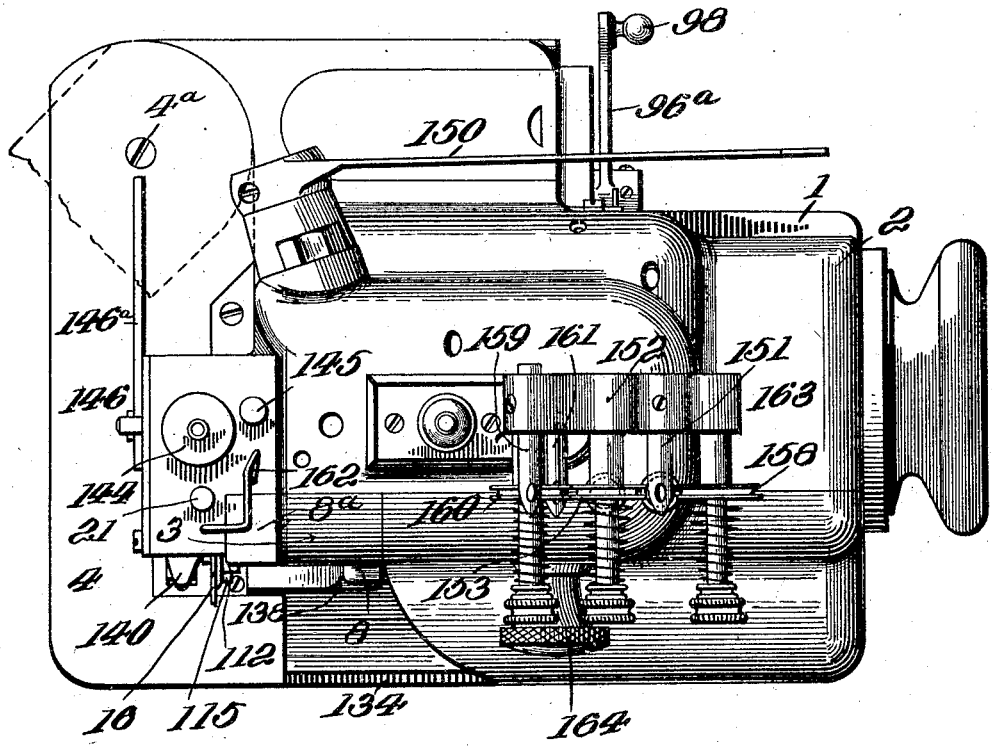

Aug. 11, 1925.
D. S. SEYMOUR
1,548,909
OVERSEAMING MACHINE
Filed Feb. 27, 1919     14 Sheets-Sheet 12
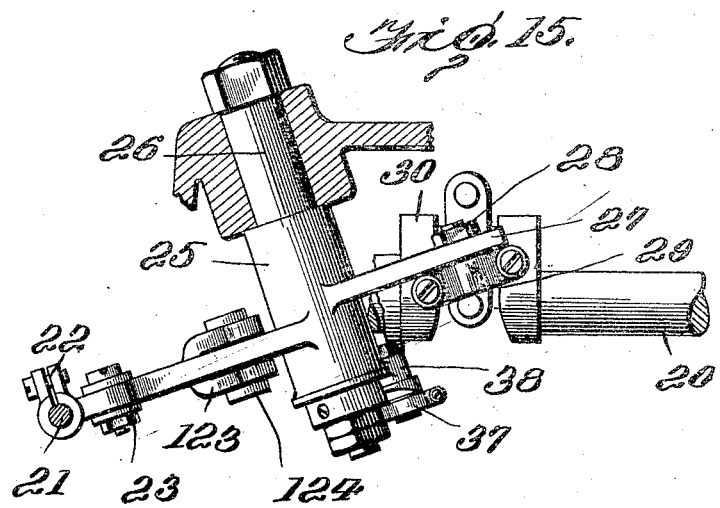
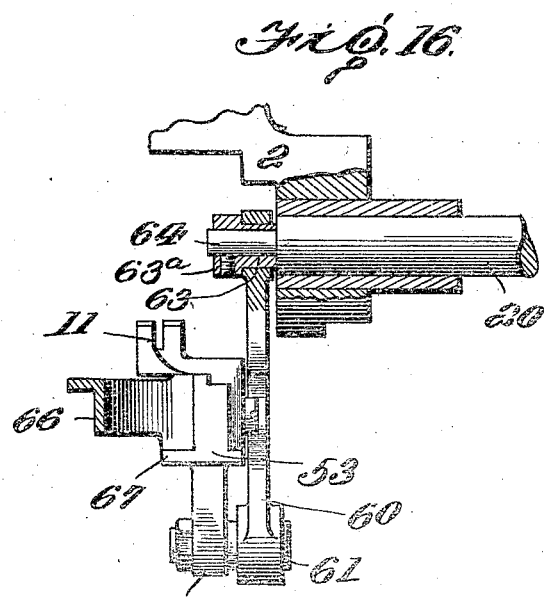

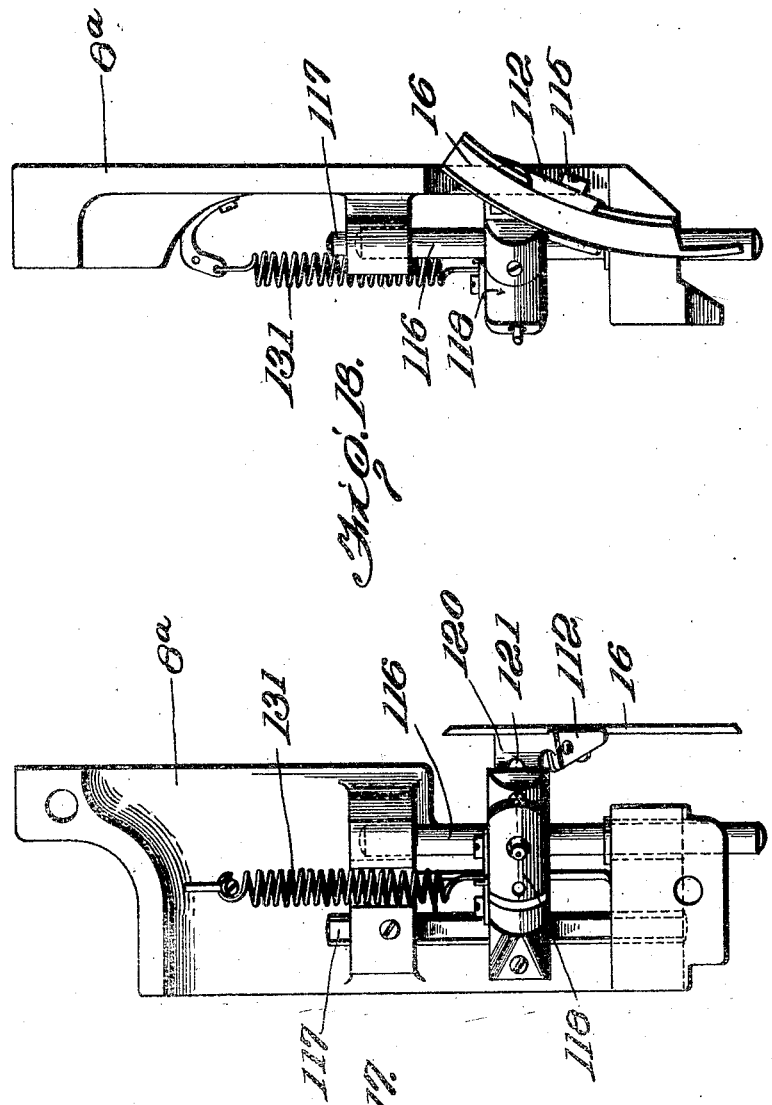

Aug. 11, 1925.
D. S. SEYMOUR
1,548,909
OVERSEAMING MACHINE
Filed Feb. 27, 1919   14 Sheets-Sheet 14
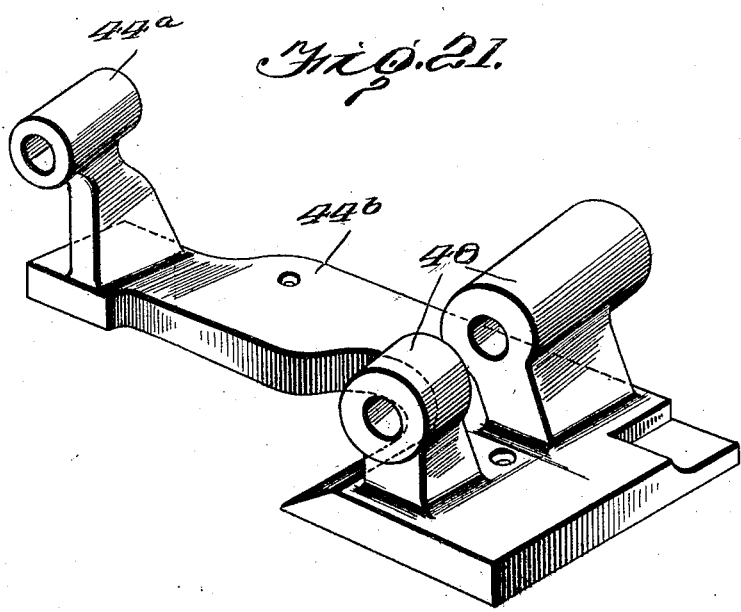
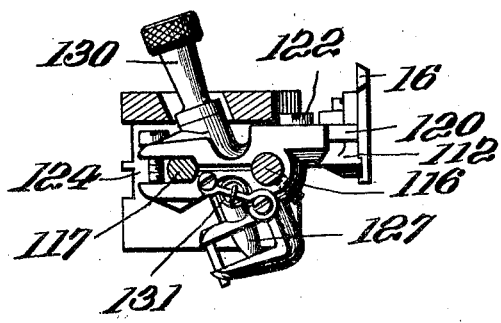
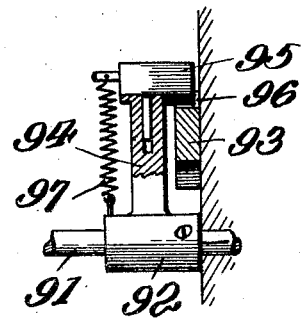

Patented Aug. 11, 1925.

1,548,909

UNITED STATES PATENT OFFICE.

DUDLEY S. SEYMOUR, OF OAK PARK, ILLINOIS, ASSIGNOR TO UNION SPECIAL MACHINE COMPANY, OF CHICAGO, ILLINOIS, A CORPORATION OF ILLINOIS.

OVERSEAMING MACHINE.

Application filed February 27, 1919. Serial No. 279,507.

*To all whom it may concern:*

Be it known that I, DUDLEY S. SEYMOUR, a citizen of the United States, residing at Oak Park, in the county of Cook, State of Illinois, have invented certain new and useful Improvements in Overseaming Machines, of which the following is a description, reference being had to the accompanying drawing and to the figures of reference marked thereon.

The invention relates to new and useful improvements in sewing machines, and more particularly to a sewing machine for forming overedge stitches.

An object of the invention is to provide a machine which shall be of few parts and wherein the trains of mechanism for operating the stitching elements shall be relatively short and shall be positive in their movement, so that the machine may be driven at high speed and with little or no objectionable vibration therein.

A further object of the invention is to provide a machine of the above character, wherein the needle, the movable trimmer and one of the loopers are operated from a main lever in the overhanging arm which is directly actuated from the main shaft.

Another object of the invention is to provide an overedge looper which moves upwardly in a substantially vertical direction and thence substantially horizontally over the presser foot, in order to effect sufficient clearance when sweaters or other thick materials are being sewed.

A further object of the invention is to provide a machine of the above character, wherein the main shaft is centrally located in the machine, so that the connections of the various parts operated thereby may be very short.

A further object of the invention is to provide a machine of the above character, wherein the movement of one of the loopers and one movement of the feed dogs may be secured from the same connection with the main shaft, thereby reducing the operating connections with the main shaft to a minimum.

A still further object of the invention is to provide a machine of the above character, wherein the feed dogs may be raised and lowered by a direct connection with the main shaft located centrally of the machine and above the work support.

A further object of the invention is to provide a machine of the above character with a feeding mechanism including a main feed dog and an auxiliary feed dog, wherein the throw of the auxiliary feed dog may be readily adjusted and wherein the operating mechanism for the feed dogs and for varying the throw of the auxiliary feed dog are substantially disposed at one side of the vertical plane containing the line of feed so that said feeding mechanism is especially adapted for use in connection with an overseaming machine for overseaming the edges of small tubular articles.

Still another object of the invention is to provide a sewing machine of the above character having a trimming mechanism, wherein the movable trimming member is reciprocated vertically by a direct connection with the lever for operating the needle bar, and wherein the trimming member may be disconnected from said lever to render the trimming mechanism inoperative at will.

These and other objects will in part be obvious and will in part be hereinafter more fully disclosed.

In the drawings which show by way of illustration one embodiment of the invention—

Figure 2 is a view partly in vertical section longitudinally of the machine and partly in front elevation;

Figure 3 is a view partly in vertical section transversely of the machine and partly in end elevation;

Figure 4 is a view partly in section and partly in plan showing more particularly the feed operating mechanism;

Figure 5 is a view showing more or less diagrammatically the stitch forming mechanism and the actuating devices therefor;

Figure 6 is a view showing in perspective, and with some of the parts detached and separated, the actuating mechanism for the needle, the lower looper and the trimmer;

Figure 7 is a view in perspective with the parts detached and separated, showing the feed operating mechanism;

Figure 8 is a perspective view with some of the parts detached and separated, showing the trimming mechanism, bed plate and the strip guide;

Figure 9 is a sectional view through a portion of the trimming mechanism;

Figure 10 is a perspective view showing the presser foot lifting mechanism;

Figure 11 is a view showing more or less diagrammatically, the throat plate, the fabric, the presser foot, the needle and the co-operating thread implements with the needle at the lower end of its stroke;

Figure 12 is a similar view but showing the needle on its upward stroke and the spreader just taking the looper thread loop from the lower thread carrying looper;

Figure 13 is a similar view but showing the needle at the upper end of its stroke, and the looper and spreader in their co-operating position;

Figure 14 is a top plan view of the machine, showing in broken lines the manner of swinging the cloth plate to one side;

Figure 15 is a view partly in plan and partly in section, showing the angular position of the needle operating lever relative to the main shaft which operates the same;

Figure 16 is a view partly in side elevation and partly in section, showing the connection between the main feed bar and the main shaft for raising and lowering the feed bar;

Figure 17 is a view of the supporting bracket for the trimming head carrying the upper trimming blade, said view being from the rear of the bracket after it is detached;

Figure 18 is an edge view of the same;

Figure 19 is a transverse sectional view through the supporting bracket for the trimming head;

Figure 20 is a detail, showing the devices for holding the shaft in adjusted positions which varies the throw of the auxiliary feed dog; and Figure 21 is a perspective view of the supporting bracket for the overedge looper.

Figure 1:
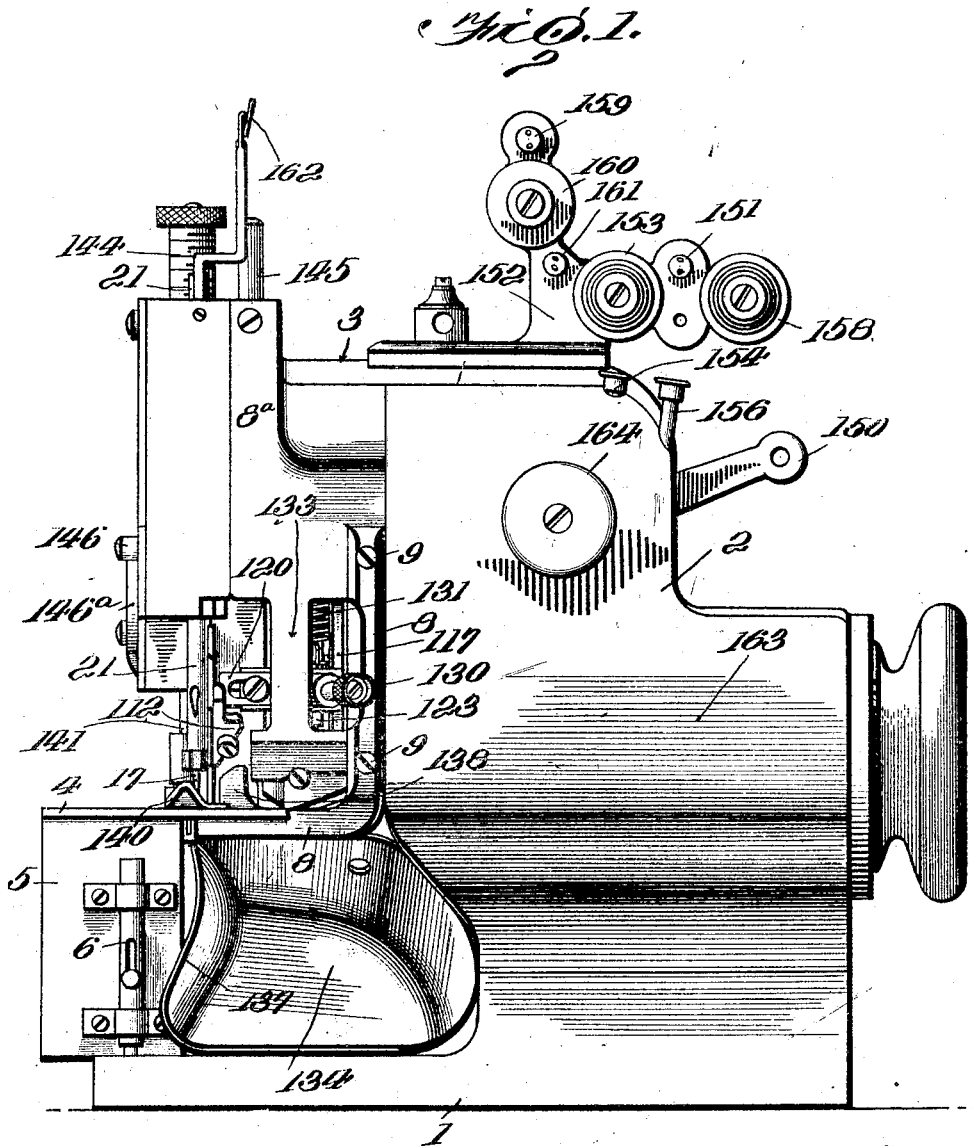
Figure 1 is a front view of a machine embodying my improvements.

The invention is directed to a sewing machine for forming overedge stitches and more particularly to the general arrangement and construction of the parts for supporting the fabric to be stitched, trimming the edge of the fabric in advance of the stitching, feeding the fabric, and for forming stitches around the edge of the fabric.

In order that the invention may be understood, I will first describe the general structure and then the several devices and the actuating mechanism therefor and then the relation of the cooperating parts and the operation of the machine.

*General structure.*

The sewing machine embodying my improvements consists of a supporting bed 1, having a standard 2 rising therefrom which carries an overhanging arm 3. The cloth plate 4 is provided with a depending apron 5 and this cloth plate extends along the side of the feeding mechanism and in front thereof, as shown in Figure 4 of the drawings. This cloth plate is pivoted as at 4ª, at the rear of the machine, so that it may be swung to one side and is held in normal position by a bolt 6, which is carried by the apron 5 and engages a socket in the bed plate 1. The material is supported at the stitching point by a throat plate 7. This throat plate 7 is supported at the rear end by a suitable bearing carried by the bed plate 1 and is supported at its forward end by an arm 8. This arm 8 is carried by a bracket 8ª which is detachably secured to the overhanging arm 3 of the machine, so that the front end of the throat plate is suspended. The arm 8 is attached to the bracket 8ª by screws 9—9. The throat plate is provided with feed slots 10, through which the feed dogs, indicated at 11 and 12, extend. The needle passes through the slot 13 and the stitches are formed around a stitch tongue 14. The material is trimmed in advance of the stitching mechanism by cooperating trimming members, one of which is stationary and the other is movable. The stationary trimming member is indicated at 15 in the drawings and the movable trimming member is indicated at 16. The arm 8 and throat plate are suspended in order to form a sufficient clearance space for the trimmed strip to be deflected downwardly and toward the front of the machine, and for permitting small tubular articles to encircle the throat plate in the line of feed and be stitched.

The overedge stitches are formed in the present embodiment of the invention by a needle 17 and an under thread carrying looper 18, and an overedge thread carrying implement 19 which is preferably in the form of a spreader, which takes the loop of thread formed by the under looper and carries the same over the edge of the material for the needle to enter. It will be understood, of course, that a thread looper and a spreader are interchangeable in this type of machine, and, therefore, from certain aspects of the invention either may be used beneath the work support and likewise either may be used for cooperation with the needle above the work support. All the parts of the machine are operated from an actuating shaft 20. This actuating shaft is mounted in suitable bearings carried by the standard 2 and the bed plate 1 of the machine. It is to be noted that the axis of the shaft 20 lies just above the upper surface of the work support 4 and is disposed at a point some distance below the longitudinal axis of the overhanging arm 3. The actuating devices for the various parts will now be described in detail.

*Needle actuating mechanism.*

The needle actuating mechanism is shown more particularly in Figures 2, 3, 5 and 6 of the drawings. The needle is carried by a needle bar 21, which is mounted to reciprocate in suitable bearings carried in the overhanging arm. This needle bar is provided with a sleeve 22 which is clamped thereto. A link 23 is pivoted to a lug projecting from the sleeve 22. This link is also pivoted to a main operating lever 24 which actuates several of the parts of the machine. This main operating lever operates the trimming mechanism and also the lower looper, as will be more fully described later.

The main actuating lever is provided with a bearing sleeve 25, which is journaled on a bearing stud 26 carried by the overhanging arm and projecting forwardly therefrom. The lever 24 is provided with an arm 27 carrying a ball stud 28, to which the eccentric strap 29 is pivoted. This eccentric strap is connected to a crank pin carried by crank arms 30—30, which are formed as a part of the shaft 20. As the shaft 20 rotates, this main actuating lever 24 will be oscillated and this will reciprocate the needle bar in its supporting bearings. The shaft 20, as shown in Figure 3, is disposed considerably in rear of the needle bar 21. The stud 26 is so disposed on the overhanging arm that the lever 24 is arranged to vibrate in a vertical plane which cuts the axis of the shaft 20 at an acute angle. This enables the rear end of the lever 24 to be directly above the shaft 20, while the forward end of this lever is directly beneath the lug carried by the sleeve 22. The lever is comparatively short so that there is very little vibration or spring to the parts of the lever and as a result the needle bar is reciprocated positively by a very short train of mechanism, wherein the movements of the parts are brought about by direct thrust elements.

It is well understood that an overseaming machine must be a high speed machine as the overseaming stitches are used for covering the edge of the material and these stitches must be placed close together in order to efficiently conceal the edge of the material and produce an effective artificial selvage. As the stitches have to be close together the machine must be driven at very high speed in order to turn out commercially the product. The actuating mechanism is especially adapted for a high speed machine of the above character for reasons which have been stated.

*Under looper actuating mechanism.*

The under looper actuating mechanism is shown more particularly in Figures 2, 5 and 6 of the drawings. The under looper, indicated at 18, is secured to an arm 31 formed as a part of a sleeve 32. This sleeve 32 is journaled on a suitable bearing 33, which in turn is carried by a bracket 34 adjustably secured to a supporting base plate 33ª. This adjustable base plate 33ª is secured to the bed plate of the machine by a pivot pin 33ᵇ and is adjustable about this pin. It is held in adjusted position by a screw passing through a slot 33ᶜ. The bracket 34 is secured to this base plate by screws which pass through slots 34ª. The bearing 33 is threaded into the opening 34ᵇ and is held therein by a lock-nut 34ᶜ. The sleeve 32 has a second arm 35 carrying a ball stud 36. A link 37 engages this stud 36 at its lower end, and its upper end is connected to a ball stud 38 carried by an arm 39, which is formed as a part of the sleeve 25. This sleeve 25 is a part of the main lever 24, and, therefore, it will be apparent that the link 37 receives its endwise movement from this main lever 24.

From Figure 5, it will be noted that when the looper 18 is at the forward end of its stroke, the link 37 and the arm 39 are substantially in line; or, rather, the axis of the lever 24, the center of the ball stud 38 and the center of the ball stud 36 are in line and this gives a dwell to the looper at the forward end of the stroke. When the looper is at the rear end of its stroke the arm 39 and the link 37 are at an acute angle to each other and the looper is moved very rapidly. This enables the looper to be moved very quickly into the needle loop and then slowly to the forward end of its stroke, as shown diagrammatically by the dots in Figures 11 and 13. It will be noted that the looper is driven by a link which is directly connected at one end to the main operating lever and at the other end to the looper supporting sleeve or carrier, and, therefore, the train of mechanism for operating the looper is very short and imparts positive movements to the looper which contribute to efficient high speed movements in the looper.

*Actuating mechanism for overedge implement.*

The actuating mechanism for the overedge implement is shown more particularly in Figures 2 and 5 of the drawings. As shown in the drawings, this overedge implement is in the form of a spreader which engages the looper thread loop and carries the same over the edge of the material to a position where the needle in its descent will enter it.

The looper spreader 19 is carried by an inverted L-shaped support 40. The spreader is secured to the horizontal arm 40$^a$ of said support by a set-screw 41. The support intermediate its end is pivoted to a swinging link 42. Said support is connected to the link at 43. This link 42 is fixed at its lower end to a pivot shaft 44, journaled in a bearing 44$^a$, mounted on a bracket 44$^b$, which in turn is secured to the bed plate 1, see Figure 21. The lower end of the vertical arm 40$^b$ is pivoted at 45 to an arm 46. This arm 46 is attached to a short shaft 47, journaled in spaced bearings 48, mounted on the bracket 44$^b$. An arm 49 is also connected to this short shaft 47. This arm 49 carries a ball stud 50. A link 51 cooperates with the ball stud 50 and this link in turn cooperates with a crank pin carried by crank arms 52—52 formed as a part of the main shaft 20. The axis of the shaft 44, and also the axis of the shaft 47 are inclined to a horizontal plane containing the bed plate and also to a vertical plane containing the line of feed. By this arrangement the spreader is moved from a point in rear of the looper beneath the level of the work support to a point in front of the needle above the work support notwithstanding the fact that the looper moves in rear of the needle beneath the work support and also in a plane which carries the same slightly toward the front of the machine as it moves forward into the needle loop.

It will be noted from Figure 5 of the drawings that when the overedge thread carrying implement 19 is at the lower end of its stroke, the link 42 is substantially horizontal, while the arm 46 is below the horizontal. As this implement 19 moves upwardly to the full line position, the extreme end of the link 42 moves to the left, and at the same time the extreme end of the arm 46 moves to the left and the timing of these parts is such that the end of the implement moves upwardy in a substantially vertical direction until a position is reached well above the presser foot and then the end of the implement moves quickly in a substantially horizontal path until it has crossed the path of the needle. In Figures 11 to 13, inclusive, I have shown by the line $x$—$x$ the path of travel to a fixed point in the loop spreader or implement. The fabric is indicated at F in the drawings, and the presser foot at 140. It will be apparent from an inspection of these figures that the spreader moves almost vertically until it is well above the presser foot even though there be several plies of fabric thereunder, and it is then moved laterally in a position for the needle to enter the looper thread loop carried thereby. The first part of the movement of the spreader 19 is relatively slow, as indicated by the dots in the line $x$—$x$. The thread carrying looper moves forwardly into the needle loop and to its extreme forward position, while the spreader completes the last part of its return movement and then moves upwardly to engage the thread of the thread carrying looper. The spreader then carries the looper thread well above the presser foot and holds the loop for the needle to pass down into the same.

*Feeding mechanism.*

The feeding mechanism is shown more particularly in Figures 3, 4 and 7 of the drawings. The feed dog 11, hereinafter referred to as the main feed dog, is carried by a main feed bar 53. This feed bar is pivoted at its rear end to a feed rocker 54. Mounted on the feed rocker 54 is an arm 55 which projects forwardly and upwardly, and carries a ball stud 56 at its outer end. A link 57 engages this ball stud at its upper end and the lower end of said link 57 engages a ball stud on an arm 59 secured to the shaft 47, see Figures 2 and 5 of the drawings. The shaft 47, as above described, is oscillated by the link 51. This through the link 57 oscillates the feed rocker which moves the main feed bar back and forth. This feed bar is raised and lowered by a link 60. This link is pivotally connected at its lower end to a bolt 61 threaded into an opening 62 in the feed bar 53. The link 60 at its upper end engages an eccentric 63 fixed to a pin 64 extending from the end of the main shaft 20. This eccentric is adjustably connected to the pin by a set screw 63$^a$. As this main shaft 20 rotates the link 60 will be raised and lowered and this will raise and lower the feed bar 53.

The feed dog 12, hereinafter referred to as the auxiliary feed dog, is carried by a shank 65 which is mounted for vertical adjustment at the outer end of an auxiliary feed bar 66. This auxiliary feed bar 66 rests on a shelf or flange 67 projecting laterally from the main feed bar 53 and is held in place thereon by a plate 68. The auxiliary feed bar has a laterally projecting flange 69, which is located directly above the flange 67. The plate 68 has a laterally projecting flange 70. The plate 68 is secured to the main feed bar by screws 71. The flanges referred to make a very firm bearing for the auxiliary feed bar, so that it may be moved back and forth on the main feed bar, but will be raised and lowered with said main feed bar. The auxiliary feed bar is formed with elongated slots 72 through which the screws 71 pass and this permits of a limited movement of the auxiliary feed bar on the main feed bar. As above noted, this auxiliary feed bar is raised and lowered with the main feed bar, so that the two feed dogs will be brought simultaneously into engagement with the material and also simultaneously moved away from the material. The auxiliary feed bar is given its endwise movements on the main feed bar by a link 73 which is connected to a pin 74, projecting laterally from the auxiliary feed bar. The said pin is carried by a lug 75 and is held in the lug by a set screw 76. The main feed bar is cut away so that the lug 74 projects through the cut away section and moves back and forth in said cut away section. The link 73 at its other end is connected to a perforated lug 77 carried by an arm 78, having a segment slot 79 formed therein. This arm is formed as a part of a sleeve 80 mounted on a shaft 81 journaled in a bearing bracket 82, which is clamped to the bed plate. The arm 78 is vibrated by a link 83, which carries a pivoted shoe 84 shaped to engage said segment slot 79. The link 83 is formed as a part of a sleeve 85. The sleeve 85 is journaled on the pin 86 carried by the feed rocker 54, and this pin also connects the main feed bar to the feed rocker. As the feed rocker moves back and forth it will oscillate the arm 78 and the arm 78 will in turn through the link 73 move the auxiliary feed bar back and forth. The shoe 84 freely engages the slot 79 and may be adjusted in said slot toward and from the center of the shaft 81 for varying the stroke of the auxiliary feed bar. This adjustment is brought about by a link 87. The upper end of the link 87 is pivoted at 88 to the arm 83. The lower end of this link is pivoted at 89 to an arm 90, fixed to a shaft 91. The shaft 91 is mounted in suitable bearings, one of said bearings being formed as a part of the bearing bracket 82 for the shaft 81. The shaft 91 carries a sleeve 92 supporting a bracket arm 94, on which is mounted a bodily moving dog or pawl 95. This dog or pawl 95 is adapted to engage a segment rack 93 secured to the standard of the machine. Also mounted on the shaft 91 is a hand lever 96ª. The shaft may be turned by means of the lever 96ª and the dog will slide from one tooth to another of the segment 93. A spring 97 holds the dog in engagement with the teeth in the segment. The oscillation of the shaft 91 raises or lowers the arm 90 and through the link 87 shifts the shoe 89 in the slot 79, and thus the stroke of the auxiliary feed bar will be varied.

From the above, it will be apparent that I have provided a very simple feeding mechanism which includes a main feed dog and an auxiliary feed dog and the stroke of the auxiliary feed dog may be varied relative to the stroke of the main feed dog and thus the material slightly gathered in advance of the stitching mechanism. This is very desirable in connection with the operation of knit fabrics as it prevents undue stretching of the material.

Trimming mechanism.

The trimming mechanism, as above noted, includes a stationary trimming blade 15 and a movable trimming blade 16. The actuating mechanism for the movable trimming blade and the means for adjustably supporting the stationary trimming blade are shown more particularly in Figures 1, 2, 3, 8 and 9 of the drawings. The stationary trimming blade 15 is adjustably mounted on a bracket 99. The blade is clamped on said bracket by a plate 100 which is held to the bracket by a screw 101. The bracket is formed with a depending rib 102, which fits in a groove 103 in a base plate 104, carried by the bed plate 1 of the machine. Said bracket is formed with a slot 105, which is parallel with the rib and centrally disposed over the same and this slot receives a clamping screw 106, which clamps the bracket to the base plate 104. The bracket is shifted on the base plate when the clamping screw is released by means of an adjusting screw 107. This adjusting screw 107 is provided with a fixed collar 108, which is spaced from the head 109 of the screw, and a retaining plate 110, screwed to the base plate 104, is formed with a slot 111 which receives the portion of the adjusting screw between the head of the screw and the collar 108. This holds the adjusting screw from endwise movement. This screw is threaded into the bracket 99 and when the screw is turned it will force the bracket back and forth in the groove 103 depending upon which way the screw is turned. This provides a very simple device for suporting the stationary trimming blade 15, which enables it to be shifted at will in a direction at right angles to the line of feed so as to vary the distance of point of trimming of the material from the needle and this, of course, in turn varies the width of the overseam.

The movable trimming blade 16 is mounted on a bracket 112. The blade 16 is curved in the arc of a circle and the bracket 112 is formed with a curved slot 113 for the blade. Said bracket is split at 114 and a screw 115 passing through the split end of the bracket draws the sections of the bracket tightly against the blade so as to clamp the blade in adjusted positions in the slot 113.

The bracket 8ª carries two posts 116 and 117. The post 117 is fixed to the bracket and the post 116 slides vertically in bearings formed in the bracket. Fixed to the post 116 is a trimmer head 118 and said head slides freely on the post 117. This post 117 prevents the trimmer head from swinging laterally. Said trimmer head is provided with a seat 119 for the shank 120 of the bracket 112. Said shank is slotted at 121 and a set-screw 122 passing through the slot and threaded into the trimmer head 118 holds the bracket on the head. By releasing this screw the bracket may be shifted toward and from the stationary trimming blade 15 and the movable blade set so as to properly cooperate with said stationary blade. The trimmer head 118 is reciprocated vertically by means of a link 123. The trimmer head 118 is formed with a slot 124, in which this link 123 freely moves. The link 123 at its upper end is pivoted at 125 to the main operating lever 24. This causes the link to move up and down vertically. The trimming head 118 is locked to the link 123 by a spring pressed bolt 126. Said link is formed with a recess 127 adapted to receive the end of the bolt and when said bolt is in locking engagement with the link, then the trimming head will be reciprocated vertically and this will cause the movable trimming blade to reciprocate and cooperate with the stationary trimming blade in trimming the fabric. The bolt 126 is forced downwardly by a spring 128 which bears against a collar 129 fixed to the bolt 126. Said bolt at its outer end is provided with a hand piece 130 which enables the bolt to be readiliy withdrawn from the recess in the link thus freeing the trimming head from the link so that the link will reciprocate freely up and down but no movement will be imparted to the trimming head. The trimming head is raised to inoperative position when released from the link 123 by means of a spring 131 which is connected at one end to the trimming head and at its upper end to part of the frame forming the overhanging arm. The bolt 130 may be held retracted against the action of the spring by means of a pin 132 which is adapted to engage a recess in the trimming head. The bolt is withdrawn and the pin moved out of alinement with the recess and this will hold the bolt withdrawn until the turning of the hand piece 130 brings the pin into register with the recess and then the spring will force the bolt forward and said bolt will seat in the recess in the link 123 and this will cause the trimming blade to become operative to perform its trimming function. It will be noted that the link 123 is a vertical link and therefore the trimming head is moved up and down by a direct connection with the main lever 24 and a direct thrust imparted to the movable trimming blade. This forms a very efficient trimming mechanism which may be operated at high speed and with little or no unnecessary vibration in the parts. There is an upper plate 133 attached to the overhanging arm and extending downwardly therefrom which covers a portion of the moving parts of the trimming mechanism. Said cover plate is formed with a slot through which the hand piece 130 projects.

Strip guide.

In order that the trimmed off edge of the fabric may be deflected away from the operating parts of the machine, I have provided a strip guide 134. Said strip guide is carried by a bracket 135 which is secured to the bracket 99 by means of screws 136, see Figure 8. This strip guide has a forwardly projecting section 137 which prevents the trimmed off strip from passing back underneath the throat plate. It also has an upwardly projecting part 138 and a forwardly projecting part 139 which serves to guide the strip downwardly so that it will come into engagement with the main portion of the strip guide 134 and return backwardly under the arm 8 which carries the throat plate. The strip guide 134 being mounted on the bracket carrying the stationary trimmer will be adjusted with the stationary trimmer and will therefore always be maintained in proper position relative to the trimming members.

Presser foot and lifting mechanism therefor.

The material is held on the work support by means of a presser foot 140. This presser foot is of the usual construction and is mounted on a presser bar 141. The presser bar is forced downwardly by means of a spring 142 which bears against a lug 143, on the presser bar at its lower end and against an adjustable sleeve 144 at its upper end. Associated with the presser bar is a guide bar 145 which is of the usual construction. Extending outwardly from the lug 143 is an arm 146. Mounted in the overhanging arm is a shaft 147. This shaft carries an arm 148 which is bent laterally at 149 so as to project underneath the lug 143 and between the presser bar 141 and the guide bar 145. The shaft 147 at its outer end is provided with an arm 150 to which a suitable treadle or knee shift may be connected. When the arm 150 is depressed the arm 148 is raised and this will lift the presser bar and the presser foot carried thereby. On the arm 148 is a lug 148$^a$ which receives the lower end of a coil spring 148$^b$, the upper end of the spring being received by a stationary lug 148$^c$. This spring retains the lever arm 150 stationary when the foot is moving up and down during the feeding action. A hand lever 146$^a$ cooperating with the lug 143 may be used to lift the foot.

Thread guiding devices.

The thread for the lower looper is led from the supply through a suitable guide 151 carried by a bracket 152, mounted on the overhanging arm. From this guide the thread passes through a suitable tension 153 and is thence led into a tube 154 which extends down through the work supporting arm underneath the throat plate, the end 155 of the tube being located adjacent the path of movement of the lower looper. This provides for an efficient way of guiding the thread to the looper and avoids any possible chance of the thread being caught by the moving parts. If the overedge implement is a threaded implement, then the thread therefor is led down through a tube 156. Adjacent the end of the tube 156 is a take up 157 which is carried by the arm 40ᵇ of the spreader support 40 and this thread take-up controls the thread so as to prevent any undue slack therein and also to aid in the setting of the stitches. The thread for the overedge implement is led through a guide 158 into the tube 156.

The needle thread is led from the supply through a guide 159 and thence through a tension 160 to a guide 161 and from the guide 161, said thread passing to a guide eye 162 and thence through the needle bar which is hollow to the needle.

The machine is provided with a removable cover plate 163 which has an end piece 164 serving as a means of locking the cover plate in place and for lifting the cover plate from the machine. All the parts are well covered and protected from dirt and lint.

Operation of the machine.

It is thought that the operation of the machine will me apparent from the detailed description of the various parts. The material to be stitched is fed over the work support by the feeding mechanism which presents the material first to the trimming members, where the edge is trimmed, and thence to the stitching mechanism where the edge is covered by the stitching threads, thus forming the overedge stitching. The needle, the under looper and also the trimmer are all actuated from a main lever in the overhanging arm, which in turn is actuated by the main shaft. The main shaft is directly connected to the shaft and the connections between this main lever and the parts operated thereby are very few and relatively short so that each part may be actuated at high speed with little or no vibration in the parts of the machine. One movement of the overedge looper and the back and forth movements of the feed dog are secured from the same connection with the main shaft, while the up and down movements of the feed dog are secured from a different connection with the main shaft.

It will be noted that the main shaft is very short and through the three connections therewith, above referred to, all the parts of the machine are operated and that these three connections with the main shaft are well distributed relative to the bearings for the shaft and so as to bring about a proper balance in the rotation of the shaft. The trimming mechanism may be quickly thrown into or out of operation, as desired, and when in action the movable blade is operated by a direct thrust connection from the main operating lever.

It will be noted, also, that the main shaft is disposed above the plane of the work support and is, therefore, very centrally located in the machine, so that the actuating parts may be made very short. It will also be noted that the machine is very compact; that the overhanging arm is extremely short so that there is little or no vibration therein. All of the above features contribute to a very light and durable high speed machine especially adapted for overedging fabrics.

It will also be noted that the feed operating mechanism and the devices for regulating the stroke of the auxiliary fed dog are substantially disposed at the right-hand side of the line of feed, as viewed in Figure 2 of the drawings. Furthermore, the main shaft terminates at the right-hand side of the line of feed. The throat plate is also suspended, so that when the cloth plate is thrown to one side small tubular articles may be readily stitched without any danger of the operating parts interfering therewith.

It is obvious that minor changes in the detail of construction and the arrangement of parts may be made without departing from the spirit of the invention as set forth in the appended claims.

Having thus described my invention, what I claim as new and desire to secure by Letters Patent, is:

1. A sewing machine including in combination, a work support, an arm overhanging said work support, a needle bar reciprocating in the outer end of said arm, a feeding mechanism beneath the work support, complemental stitch forming mechanism mounted beneath the plane of the work support and co-operating with the needle, a main shaft located intermediate the overhanging arm and the work support and parallel with the longitudinal axis of the overhanging arm, said shaft having actuating members spaced along the length thereof, devices actuated by said spaced members for positively reciprocating said needle bar, operating said complemental stitch forming mechanism, and actuating said feed for feeding the material across the work support in a direction at right angles to the plane of the overhanging arm.

2. A sewing machine including in combination, a work support, an overhanging arm, a main rotating shaft located intermedate the work support and the overhanging arm, a needle and complemental stitch forming mechanism for forming overedge stitches, means for trimming the fabric in advance of the stitching mechanism, and vibrating devices for positively operating said needle, complemental stitch forming mechanism and said trimming means from said main shaft.

3. A sewing machine including in combination, a work support, an overhanging arm, a main rotating shaft located intermediate the work support and the overhanging arm, a needle and complemental stitch forming mechanism for forming overedge stitches, means for trimming the fabric in advance of the stitching mechanism, a feeding mechanism including a main feed dog and an auxiliary feed dog, and vibrating devices for positively operating said needle, said complemental stitch forming mechanism, said trimming means and said feeding mechanism from said main shaft.

4. A sewing machine including in combination, a work support, an overhanging arm, a main rotating shaft located intermediate the work support and the overhanging arm, a lever mounted in said overhanging arm, means for directly connecting said lever to said shaft, a needle bar, a needle carried thereby, means for connecting said needle bar directly to said lever, complemental stitch forming mechanism for forming overedge stitches including a looper disposed beneath the work support, and means operated by said lever for oscillating the looper.

5. A sewing machine including in combination, a work support, an overhanging arm, a main rotating shaft located intermediate the work support and the overhanging arm, a lever mounted in said overhanging arm, means for directly connecting said lever to said shaft, a needle bar, a needle carried thereby, means for connecting said needle bar directly to said lever, complemental stitch forming mechanism for forming overedge stitches including a pivoted looper disposed beneath the work support, and a vertically disposed link connecting the looper to said lever, whereby said looper is operated from said lever.

6. A sewing machine including in combination, a work support, an overhanging arm, a main rotating shaft located intermediate the work support and the overhanging arm, a lever mounted in said overhanging arm, means for directly connecting said lever to said shaft, a needle bar, a needle carried thereby, means for connecting said needle bar directly to said lever, complemental stitch forming mechanism for forming overedge stitches including a pivoted looper disposed beneath the work support, said lever having an arm projecting therefrom, a vertically disposed link connecting said arm to the looper beneath the work support, said link and arm being so disposed as to be substantially in line when the looper is at the forward end of its stroke, whereby a variable motion will be given thereto.

7. A sewing machine including in combination, a work support, an overhanging arm, a main rotating shaft located intermediate the work support and the overhanging arm, a lever mounted in said overhanging arm, means for directly connecting the lever to said shaft, a needle bar, a needle carried thereby, and means for reciprocating said needle bar from said lever, an arm projecting downwardly from said lever, a thread carrying looper cooperating with the needle beneath the work support, an overedge thread manipulating implement cooperating with the looper and the needle, and a link for connecting the looper beneath the work support with the arm on said lever, said arm and link being disposed so as to be substantially in line when the looper is at the forward end of its stroke, whereby a variable motion will be given thereto.

8. A sewing machine including in combination, a work support, an overhanging arm, a main rotating shaft located intermediate the work support and the overhanging arm, a needle bar reciprocating in said overhanging arm, said needle bar being disposed in a vertical plane parallel with the axis of the main shaft and located in front of the main shaft, a lever pivotally mounted in the overhanging arm and extending at an acute angle to said vertical plane, the rear end of said lever being directly over said shaft, and means directly connecting said rear end of the lever to said shaft, the forward end of said lever being adjacent the needle bar, and means directly connecting said forward end of the lever to the needle bar.

9. A sewing machine including in combination, a work support, an overhanging arm, a main rotating shaft located intermediate the work support and the overhanging arm, a needle bar reciprocating in said overhanging arm, said needle bar being disposed in a vertical plane parallel with the axis of the main shaft and located in front of the main shaft, a lever pivotally mounted in the overhanging arm and extending at an acute angle to said vertical plane, the rear end of said lever being directly over said shaft, means directly connecting said rear end of the lever to said shaft, the forward end of said lever being adjacent the needle bar, means directly connecting said forward end of the lever to the needle bar, a looper beneath the work support, an arm carried by said lever and projecting downwardly therefrom at the fulcrum point, and a link connecting said arm to the looper.

10. A sewing machine including in combination, a work support, an overhanging arm, a main rotating shaft located intermediate the work support and the overhanging arm, a main lever located in the overhanging arm, means for actuating said lever from said shaft, a needle bar reciprocating in the overhanging arm, a needle carried thereby, means for connecting the needle bar to said lever, a trimming mechanism including a movable trimming blade, means for connecting the movable trimming blade to said lever, a looper beneath the work support, means for operating said looper from said lever, an overedge thread carrying implement, means for reciprocating said implement including a rock shaft, means for rocking said last named shaft from the main shaft, a feeding mechanism including a feed dog, means for moving the feed dog back and forth from said rock shaft, and means for raising and lowering the feed dog from said main shaft.

11. A sewing machine including in combination, a work support, an overhanging arm, a main rotating shaft located intermediate the work support and the overhanging arm, an overedge stitch forming mechanism operated from said main shaft, a feeding mechanism including a feed bar, a feed dog carried thereby, means for moving said feed bar back and forth and means operating directly from said main shaft for raising and lowering the feed bar.

12. A sewing machine including in combination, a work support, an overhanging arm, a main rotating shaft located intermediate the work support and the overhanging arm, an overedge stitch forming mechanism operated from said main shaft, a feeding mechanism including a feed bar, means for moving said feed bar back and forth, a feed dog carried thereby, an eccentric carried by the adjacent end of the main shaft, and a vertically disposed link directly connected to the eccentric member on said main shaft and with said feed bar for raising and lowering the same.

13. A sewing machine including in combination, a work support, an overhanging arm, a main rotating shaft located intermediate the work support and the overhanging arm, overedge stitching mechanism operated from said main shaft, a feeding mechanism including a main feed bar and an auxiliary feed bar, means for moving the feed bars back and forth and means for raising and lowering the feed bars, said last named means including a direct connection with said main shaft.

14. A sewing machine including in combination, a work support, an overhanging arm, a main rotating shaft located intermediate the work support and the overhanging arm, overedge stitching mechanism operated from said main shaft, a feeding mechanism including a main feed bar and an auxiliary feed bar, means for moving the feed bars back and forth, means for raising and lowering the feed bars, said last named means including a link connected to an eccentric on the end of said main shaft and to said feed bar for raising and lowering the same.

15. A sewing machine including in combination, a work support, an overhanging arm, a main rotating shaft, a lever mounted in said overhanging arm, means for directly connecting the lever to said shaft, a needle bar, a needle carried thereby, means for connecting said needle bar directly to said lever, complemental stitch forming mechanism for forming overedge stitches including a pivoted looper disposed beneath the work support, and a vertically disposed link connecting the looper to said lever, whereby said looper is operated from said lever.

16. A sewing machine including in combination, a work support, an overhanging arm, a main rotating shaft, a lever mounted in said overhanging arm, means for directly connecting the lever to said shaft, a needle bar, a needle carried thereby, means for connecting said needle bar directly to said needle, a pivoted looper disposed beneath the work support, said lever having an arm projecting therefrom, a vertically disposed link connecting the arm to the looper, said link and arm being so disposed as to be substantially in line when the looper is at the forward end of its stroke, whereby a variable motion is given thereto.

17. A sewing machine including in combination, a work support, a main shaft having an eccentric member, a feed dog, a stitch forming mechanism including an overedge looper, and means actuated by said eccentric member for imparting forward and backward movements to said feed dog and reciprocatory movements to said overedge looper.

18. A sewing machine including in combination, a work support, a main shaft having an eccentric member, a feed dog, a stitch forming mechanism including an overedge looper, a rock shaft operated by said eccentric member, and means operated by said rock shaft for imparting forward and backward movements to said feed dog and reciprocatory movements to said overedge looper.

19. A sewing machine including in combination, a work support, a main shaft having a crank, a feed dog, a stitch forming mechanism including an overedge looper, means actuated by said crank for imparting forward and backward movements to said feed dog and reciprocatory movements to said overedge looper, and means directly connected with said main shaft for imparting up and down movements to said feed dog.

20. A sewing machine including in combination, a work support, an overhanging arm, a main rotating shaft having an eccentric member, an overedge stitch forming mechanism including a reciprocatory needle bar, a needle carried thereby, a looper below the plane of the work support and cooperating with said needle, a trimming mechanism operating in front of the needle, and means for driving said needle bar, looper and trimming mechanism from said eccentric member.

21. A sewing machine including in combination, a work support, an overhanging arm, a main rotating shaft having an eccentric member, an overedge stitch forming mechanism including a reciprocatory needle bar, a needle carried thereby, a looper below the plane of the work support and cooperating with said needle, a trimming mechanism operating in front of the needle, and means for driving said needle bar, looper and trimming mechanism from said eccentric member, said driving means including a main operating lever fulcrumed on the overhanging arm and disposed at an acute angle to a vertical plane containing the axis of said shaft.

22. A sewing machine including in combination, a work support, an overhanging arm, a main rotary shaft, a needle bar disposed in a vertical plane in front of said main shaft, a needle carried by said bar, a lever fulcrumed intermediate its ends on said overhanging arm and disposed in a vertical plane at an acute angle to a vertical plane containing the axis of said main shaft, one end of said lever being disposed adjacent said needle bar and connected thereto, the other end of said lever being disposed directly above said main shaft, driving connections between said main shaft and the adjacent end of said lever, a pivoted looper rocker mounted below the plane of the work support, a looper carried by said rocker and cooperating with said needle, and means for reciprocating said looper rocker from said lever.

23. A sewing machine including in combination, a work support, an overhanging arm, a main rotary shaft, a needle bar disposed in vertical plane in front of said main shaft, a needle carried by said bar, a lever fulcrumed intermediate its ends on said overhanging arm and disposed in a vertical plane at an acute angle to a vertical plane containing the axis of said main shaft, one end of said lever being disposed adjacent said needle bar and connected thereto, the other end of said lever being disposed directly above said main shaft, driving connections between said main shaft and the adjacent end of said lever, a pivoted looper rocker mounted below the plane of the work support, a looper carried by said rocker and cooperating with said needle, means for reciprocating said looper rocker from said lever including an actuating arm depending vertically from said lever and disposed in alignment with the fulcrum thereof, and a vertical link having its upper end pivotally connected with the lower end of said actuating arm and its lower end pivotally connected with said looper rocker, whereby a variable movement will be imparted to said looper.

In testimony whereof, I affix my signature in the presence of two witnesses.

DUDLEY S. SEYMOUR.

Witnesses:
A. B. CLOTHIER,
S. GEORGE TATE.